United States Patent
Ozaki

(10) Patent No.: US 9,403,456 B2
(45) Date of Patent: Aug. 2, 2016

(54) HEADREST SUPPORT STRUCTURE OF CONVEYANCE SEAT

(71) Applicant: TOYOTA BOSHOKU KABUSHIKI KAISHA, Aichi-ken (JP)

(72) Inventor: Akihide Ozaki, Miyoshi (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/498,173

(22) Filed: Sep. 26, 2014

(65) Prior Publication Data
US 2015/0091356 A1     Apr. 2, 2015

(30) Foreign Application Priority Data

Sep. 30, 2013  (JP) ................................ 2013-203652
Sep. 5, 2014   (JP) ................................ 2014-180769

(51) Int. Cl.
A47C 7/36     (2006.01)
B60N 2/48     (2006.01)
B60N 2/68     (2006.01)

(52) U.S. Cl.
CPC .............. *B60N 2/4802* (2013.01); *B60N 2/682* (2013.01); *B60N 2002/4897* (2013.01)

(58) Field of Classification Search
CPC ...... B60N 2/4808; B60N 2/4817; B60N 2/68; B60N 2/4802; A47C 7/38
USPC ............................. 297/391, 410, 408, 452.18
See application file for complete search history.

(56) References Cited

U.S. PATENT DOCUMENTS

| | | | |
|---|---|---|---|
| 5,397,170 A * | 3/1995 | Shrock ................. | B60N 2/4808 297/391 |
| 5,788,250 A | 8/1998 | Masters et al. | |
| 6,454,356 B1 * | 9/2002 | Yamada ............... | B60N 2/4814 297/391 |
| D547,574 S * | 7/2007 | Hong .......................... | D6/716.5 |
| 7,318,626 B2 * | 1/2008 | Ohchi ..................... | B60N 2/48 297/391 |
| 7,410,219 B2 * | 8/2008 | Kraft .................... | B60N 2/4808 297/391 |
| 2004/0090103 A1 * | 5/2004 | Yamada ................ | B21C 37/065 297/391 |

(Continued)

FOREIGN PATENT DOCUMENTS

| | | |
|---|---|---|
| CN | 203142447 | 8/2013 |
| JP | 10-14709 | 1/1998 |

(Continued)

OTHER PUBLICATIONS

Official Action, including English-language translation thereof, for CN Appl. No. 201410521291.9 mailed on May 5, 2016.

*Primary Examiner* — David E Allred
*Assistant Examiner* — Alexander Harrison
(74) *Attorney, Agent, or Firm* — Greenblum & Bernstein, P.L.C.

(57) ABSTRACT

A headrest support structure of a conveyance seat includes: an upper frame that is provided with a pair of fitting holes and that constitutes a back frame; and a pair of cylindrical headrest holders, each of which fits in one of the pair of fitting holes to be fixed to the upper frame. A transverse cross-section of a fitting portion of each headrest holder fitting in the corresponding fitting hole has an asymmetric shape about a fitting axis parallel to a fitting direction in which the headrest holder fits in the fitting hole, the transverse cross-section being a cross-section in a direction orthogonal to the fitting axis. The pair of fitting holes is formed such that each headrest holder is allowed to fit in only one of the pair of fitting holes provided at a position set as a fixing position of the headrest holder.

8 Claims, 7 Drawing Sheets

(56) References Cited

U.S. PATENT DOCUMENTS

| | | | | |
|---|---|---|---|---|
| 2004/0227389 | A1* | 11/2004 | Yoshida | B60N 2/64 297/452.18 |
| 2005/0179301 | A1* | 8/2005 | Clark | B60N 2/487 297/408 |
| 2006/0163931 | A1* | 7/2006 | Yamada | B60N 2/4817 297/410 |
| 2006/0261661 | A1 | 11/2006 | Kraft et al. | |
| 2010/0276978 | A1* | 11/2010 | Furuta | B60N 2/4808 297/410 |

FOREIGN PATENT DOCUMENTS

| | | |
|---|---|---|
| JP | 2002-79333 | 3/2002 |
| JP | 2011-11651 | 1/2011 |

* cited by examiner

FIG. 6

| | (1) LEFT HEAD REST HOLDER 30 | (2) LEFT FITTING HOLES 22, 24 | (3) RIGHT FITTING HOLES 21, 23 | (4) RIGHT HEAD REST HOLDER 30 |
|---|---|---|---|---|
| (A) PARALLEL MOVEMENT | | | | |
| (B) ROTATION 1 | | | | |
| (C) ROTATION 2 | | | | |
| (D) ROTATION 3 | | | | |
| (E) VERTICAL INVERSION + ROTATION 1 | | | | |
| (F) VERTICAL INVERSION + ROTATION 2 | | | | |
| (G) VERTICAL INVERSION + ROTATION 3 | | | | |

HEADREST SUPPORT STRUCTURE OF CONVEYANCE SEAT

INCORPORATION BY REFERENCE

The disclosure of Japanese Patent Applications No. 2013-203652 filed on Sep. 30, 2013 and No. 2014-180769 filed on Sep. 5, 2014 each including the specification, drawings and abstract is incorporated herein by reference in its entirety.

BACKGROUND OF THE INVENTION

1. Field of the Invention

The invention relates to the headrest support structure of a seat installed in a conveyance.

2. Description of Related Art

A headrest of an automobile seat is formed in such a way that right and left headrest stays annexed to the headrest are fixed to an upper frame as part of a seat back structure. Specifically, a pair of cylindrical headrest holders fits in the first and second pairs of fitting holes of the upper frame to be fixed, headrest supports fit in the respective headrest holders, and the headrest stays are fixed to the respective headrest supports so as to be movable vertically. A locking mechanism is provided between one of the headrest supports and one of the headrest stays to allow the adjustment of the vertical position of the headrest stays with respect to the headrest supports, i.e., the height of the headrest. U.S. Pat. No. 5,788,250 describes an example of such a headrest support structure of an automobile seat.

Since only one of the right and left headrest supports is provided with the locking mechanism as described above, the left headrest support and the right headrest support are different in structure from each other. In addition, in order to correctly assemble the headrest supports into the headrest holders without confusing their right and left sides, the left headrest holder and the right headrest holder are different in shape from each other. Moreover, in order to correctly assemble the headrest holders into the upper frame without confusing their right and left sides, a special jig is used to insert the headrest holders in the fitting holes of the upper frame.

SUMMARY OF THE INVENTION

In spite of the fact that the left headrest holder and the right headrest holder are almost the same in structure, they are treated as separate components at manufacturing the automobile seat, which in turn inhibits an improvement in productivity and increases cost correspondingly. The invention provides the headrest support structure of a conveyance seat that allows the common use of the headrest holders.

An aspect of the invention provides a headrest support structure of a conveyance seat, includes: an upper frame that is provided with a pair of fitting holes and that constitutes a back frame; and a pair of cylindrical headrest holders, each of which fits in one of the pair of fitting holes to be fixed to the upper frame. A transverse cross-section of a fitting portion of each headrest holder fitting in the corresponding fitting hole has an asymmetric shape about a fitting axis parallel to a fitting direction in which the headrest holder fits in the fitting hole, the transverse cross-section being a cross-section in a direction orthogonal to the fitting axis. The pair of fitting holes is formed such that each headrest holder is allowed to fit in only one of the pair of fitting holes provided at a position set as a fixing position of the headrest holder. According to the configuration, even if the pair of headrest holders is used in common, the headrest holders may be fixed at their suitable positions or may be fixed at positions suitable for the pair of headrest supports fitting in the headrest holders. Accordingly, the headrest holders can be used in common while satisfying requirements needed as the headrest holders.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is an explanatory view for describing the various shapes of headrest holders fitting in fitting holes according to the embodiment of the invention.

DETAILED DESCRIPTION OF EMBODIMENTS

Figure 1:
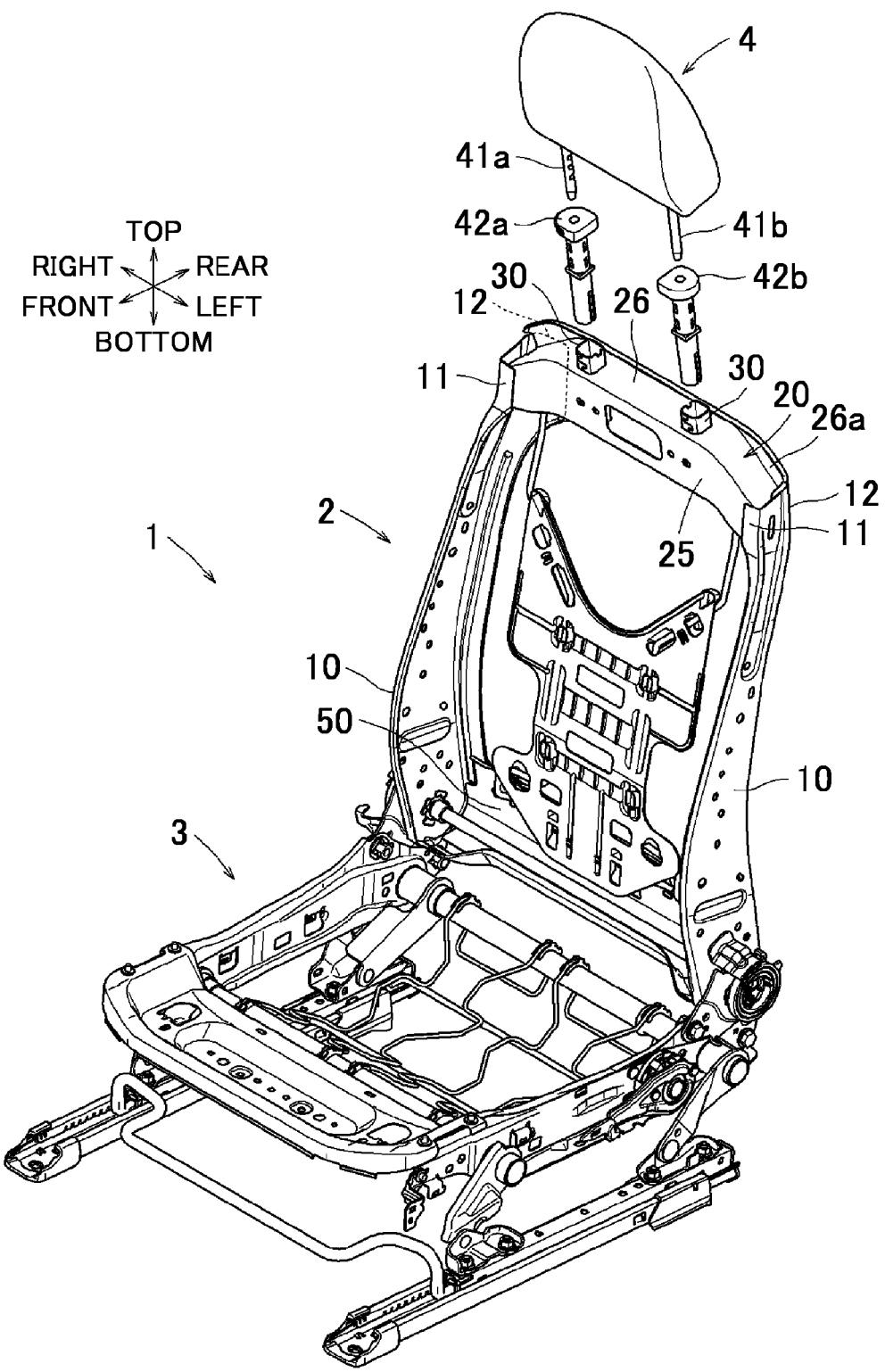
FIG. 1 is a perspective view of the structure of an automobile seat showing a first embodiment of the invention.
Figure 2:
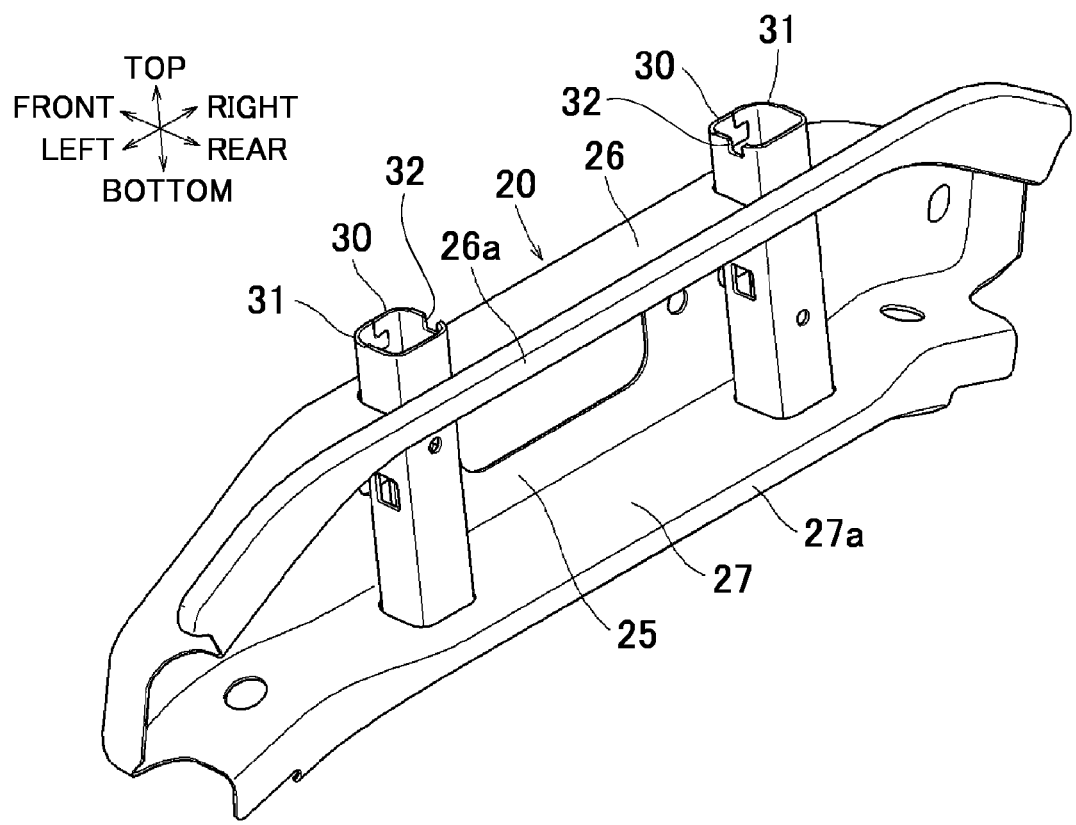
FIG. 2 is a rear perspective view of a principal portion according to the embodiment of the invention.
Figure 3:
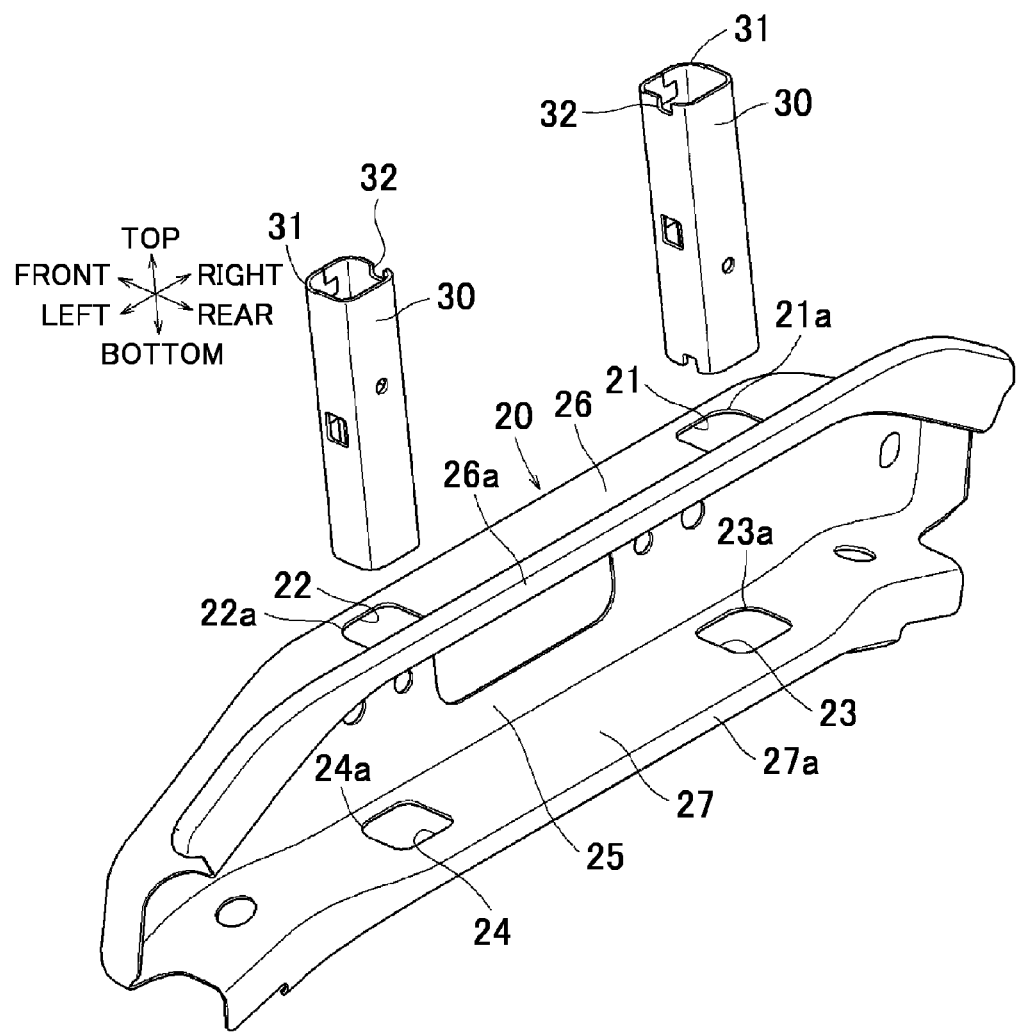
FIG. 3 is an exploded perspective view of the principal portion according to the embodiment of the invention.
Figure 4:
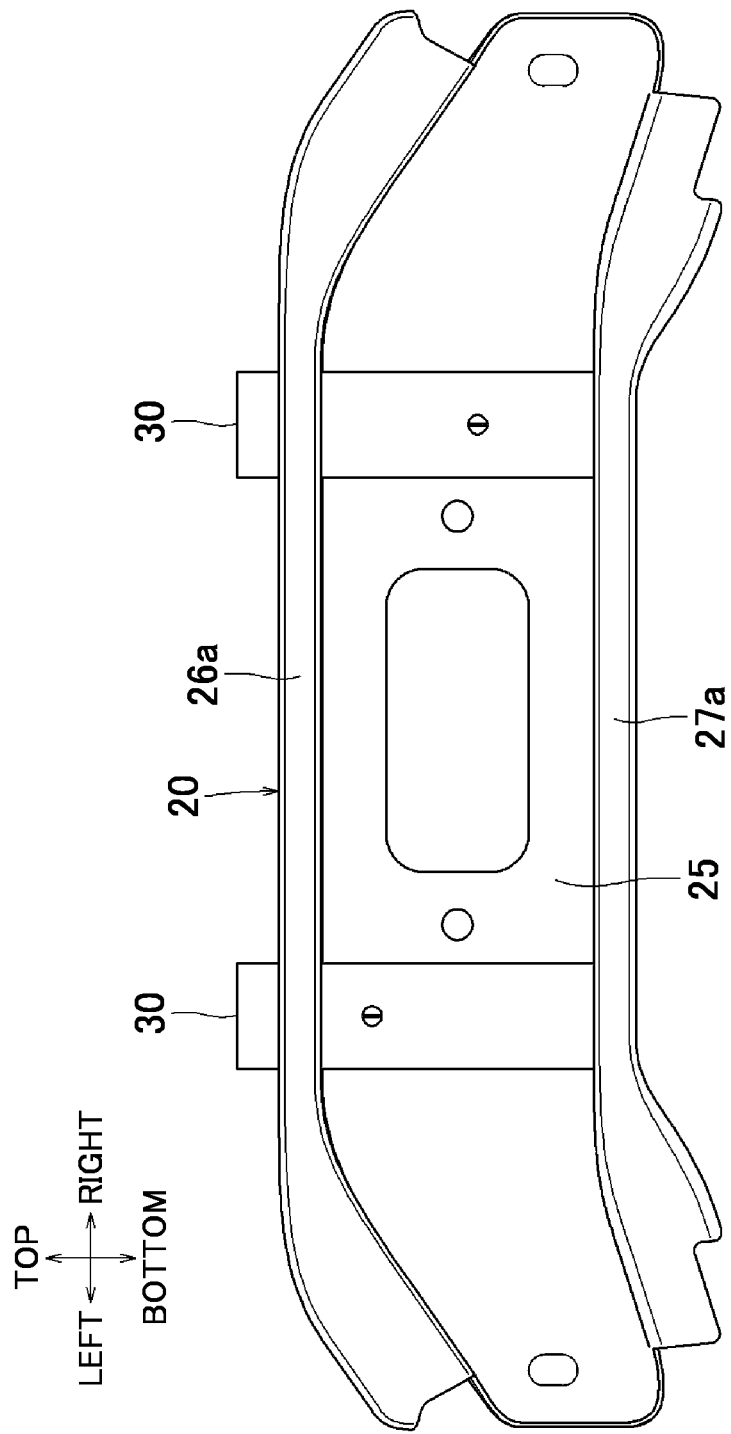
FIG. 4 is a rear view of the principal portion according to the embodiment of the invention.

FIGS. 1 to 5 show a first embodiment of the invention. The embodiment describes an example in which the invention is applied to an automobile front seat (hereinafter simply referred to as a seat). In these figures, the respective directions of the seat are, expressed by arrows. Directions that will be described below are based on these directions. Conventionally, a seat frame 1 constituting the structure of the seat has a back frame 2 and a cushion frame 3. The back frame 2 has right and left side frames 10, an upper frame 20 at the top thereof, and a lower panel 50 at the bottom thereof, which are combined together to form a frame shape. Each of the side frames 10 is made of a press-molded steel plate and provided such that most of the plane thereof is parallel to a front-rear direction. In addition, each of the side frames 10 has, at the front and rear ends thereof, front and rear flange portions 11, 12 formed to protrude toward the opposite side frame 10.

The upper frame 20 is made of a steel plate press-molded in a shape having a hat cross-sectional shape opened rearward. The upper frame 20 is held between front and rear flange portions 11 and 12 at the top of each of the side frames 10. Specifically, a front surface 25 of the upper frame 20 joins with the front flange portions 11 of the right and left side frames 10 at the right and left ends thereof. In addition, an upper flange portion 26a formed to protrude upward on the rear side of an upper surface 26 of the upper frame 20 and a lower flange portion 27a formed to protrude downward on the rear side of a lower surface 27 of the upper frame 20 each join with the rear flange portions 12 of the right and left side frames 10.

On both right and left sides at the center of the upper frame 20, cylindrical headrest holders 30 that support a headrest 4 are fixed. Each of the headrest holders 30 is formed by bending a sheet of steel plate into a cylindrical shape and then welding and joining the bended plate, and its transverse cross-sectional shape is formed in a rectangle. The transverse cross-sectional shape of each of the headrest holders 30 is uniform over the longitudinal direction of the cylindrical shape. At the upper and lower surfaces 26, 27 of the upper frame 20, fitting holes 21, 22, 23, 24 are drilled corresponding to the fixing position of each of the headrest holders 30. Each of the fitting holes 21, 22, 23, 24 is formed to have a size and a shape to receive each of the headrest holders 30. The upper frame 20 and each of the headrest holders 30 are welded and joined together in a state in which one of the headrest holders 30 fits in the upper and lower fitting holes 21, 23 and the other of the headrest holders 30 fits in the upper and lower fitting holes 22, 24. The transverse cross-sectional shape of each headrest holder 30 is a shape of a cross-section of the headrest holder 30 in a direction orthogonal to a fitting axis parallel to a fitting direction in which the headrest holder 30 fits in the corresponding fitting holes 21, 22, 23, 24.

Headrest supports 42a, 42b made of a resin fit in the right and left headrest holders 30, respectively. Headrest stays 41a and 41b annexed to the headrest 4 are fixed to the headrest supports 42a, 42b, respectively, such that they are movable vertically. A notch 32 is provided at an upper edge in one surface each headrest holder 30, and the surfaces of the headrest holders 30 in which the notches are formed face each other. In addition, a projection (not shown) to be fitted in the notch 32 is provided on each headrest support 42a, 42b at a position corresponding to a position of the notch 32. The headrest supports 42a, 42b cannot be inserted in the headrest holders 30 unless the projections of the headrest supports 42a, 42b fit in the notches 32 of the headrest holders 30. In this manner, the right and left headrest supports 42a, 42b are prevented from being erroneously assembled to the left and right headrest holders 30, respectively.

A locking mechanism is provided between the right headrest support 42a and the right headrest stay 41a to allow the adjustment of the vertical position of the headrest stay 41a with respect to the headrest support 42a, i.e., the height of the headrest 4. Specifically, the right headrest stay 41a has a plurality of transverse grooves to allow the adjustment of the vertical position of the headrest 4, and the right headrest support 42a that receives the right headrest stay 41a has an engagement piece (not shown) to engage with the transverse grooves of the headrest stay 41a to fix the vertical position of the headrest 4 and an operation knob (not shown) to release the engagement piece from its engaging state with the transverse grooves. The transverse grooves of the headrest stay 41a and the engagement piece and the operation knob of the headrest support 42a constitute the locking mechanism. Note that the left headrest stay 41b does not have transverse grooves unlike the right headrest stay 41a, and the left headrest support 42b serves only to support the left headrest stay 41b such that the left headrest stay 41b is slidable vertically.

Figure 5:
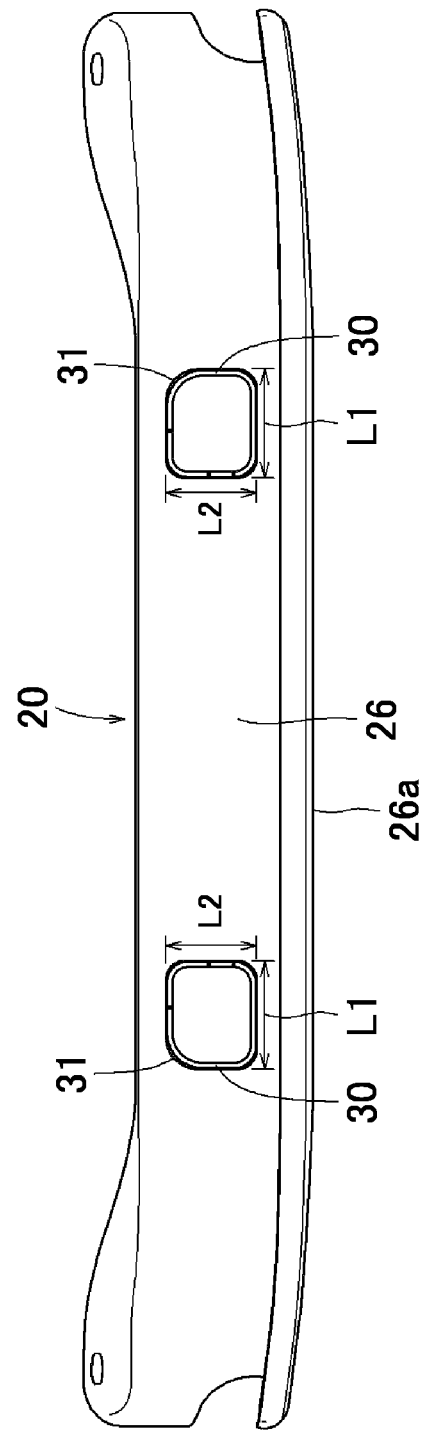
FIG. 5 is a plan view of the principal portion according to the embodiment of the invention.

As shown in FIG. 5, the transverse cross-sectional shape of each of the headrest holders 30 is a rectangle that satisfies the relationship L1>L2 where L1 expresses an outer length in the right-left direction and L2 expresses an outer length in the front-rear direction. A shape of a corner positioned on an outside in the right-direction and on the front side, among the corners of the transverse cross-sectional shape of each of the headrest holders 30, is changed such that two sides connected to the corner is joined together with a bridging portion 31 having an arc shape. As described above, one of the corners of the transverse cross-sectional shape of each of the headrest holders is formed to be different in shape from the rest corners thereof, whereby the transverse cross-sectional shape of each of the headrest holders is also changed when each of the headrest holders faces a different direction. The corners of the transverse cross-sectional shape of each of the headrest holders 30 is rounded, but one of the corners having the bridging portion 31 is more greatly rounded than the rest corners. Each of the fitting holes 21, 22, 23, 24 of the upper frames 20 is also formed in a size and a shape to receive the corresponding headrest holder 30. Thus, each of the headrest holders 30 is allowed to fit in the corresponding fitting holes 21, 22, 23, 24 only when the headrest holder 30 faces a prescribed direction. As described above, the fitting holes 21, 22 as well as the fitting holes 23, 24 arranged side by side in the right-left direction on the upper frame 20 are formed to be line symmetrical about the center in the right-left direction of the upper frame 20. Therefore, when the headrest holder 30 allowed to fit in the lilting holes 21, 23 (or the fitting holes 22, 24) on one side is inverted vertically, it is allowed to fit in the fitting holes 22, 24 (or the fitting holes 21, 23) on the other side. In other words, the headrest holder 30 fitting in the fitting holes 21, 23 on one side and the headrest holder 30 fitting in the fitting holes 22, 24 on the other side can be used in common. In addition, the right and left sides of the headrest holder 30 (the right-left direction of the headrest holder 30) are changed when each of the headrest holders 30 is inverted vertically, but the front and rear sides thereof are not changed. As described above, since each of the headrest holders 30 is formed by bending a sheet of steel plate in a cylindrical shape and then joining the bended plate, it has one joining spot. Therefore, the strength of each of the headrest holders 30 is not uniform in the front and rear direction and the right and left direction. Meanwhile, the headrest 4 serves to control the backward tilting of the head of a passenger at the rear end collision of an automobile, and a load is likely to be applied to the headrest holders 30 in the front-rear direction. Therefore, the right and left headrest holders 30 are formed such that the front and rear sides of each of the headrest holders 30 when the headrest holder 30 fits in the right fitting holes 21, 23 are the front and rear sides of the headrest holder when the head rest holder fits in in the left fitting holes 22, 24 (that is, the front-rear direction of the right headrest holder 30 is the same as the front-rear direction of the left headrest holder 30). As a result, the withstand load of the right and left headrest holders 30 can be made uniform in the front-rear direction without taking any special countermeasures. The "rectangle" referred in the invention includes a square. The rectangle having the rounded corners as shown in the embodiment is also included in the "rectangle" referred in the invention.

As described above, the headrest supports. 42a, 42b are different in structure and thus required to correctly fit in the right and left headrest holders 30, respectively. In addition, as described above, the right and left headrest holders 30 are formed to be line symmetrical to each other. Therefore, the right and left headrest supports 42a, 42b are formed in conformity with the shapes of the corresponding headrest holders 30, whereby the headrest supports 42a, 42b can correctly fit in the right and left headrest holders 30, respectively. In other words, the right headrest support 42a is formed such that the transverse cross-sectional shape of the right headrest support 42a conforms with the transverse cross-sectional shape of the right headrest holder 30 to allow the right headrest support 42a to fit in the right headrest holder 30, whereby the right headrest support 42a is not allowed to fit in the left headrest holder 30 but is allowed to fit in only the right headrest holder 30. Similarly, the left headrest support 42b is formed such that the transverse cross-sectional shape of the left headrest support 42b conforms with the transverse cross-sectional shape of the left headrest holder 30 to allow the left headrest support 42b to fit in the left headrest holder 30, whereby the left headrest support 42b is not allowed to fit in the right headrest holder 30 but is allowed to fit in only the left headrest holder 30. As described above, the notches 32 and the projections to fit in the notches 32 are provided for the purpose of preventing the right and left headrest supports 42a, 42b from being erroneously assembled to the left and right headrest holders 30, respectively. However, the headrest supports 42a, 42b may still be erroneously assembled to the headrest holders 30 respectively if each of the headrest supports 42a, 42b allowed to fit in the corresponding headrest holder 30 is rotated such that the right and left sides thereof are switched. Such an error in assembling the headrest supports 42a, 42b to the headrest holders 30 can be prevented by the headrest supports 42a, 42b each being formed such that the transverse cross-sectional shape thereof conforms with the transverse cross-sectional shape of the corresponding headrest holder 30 to receive the headrest support 42a, 42b.

The above first embodiment of the invention describes the case in which a portion (fitting portion) of the right headrest holder 30 fitting in the fitting holes 21, 23 and a portion (fitting portion) of the left headrest holder 30 fitting in the fitting holds 22, 24 are formed to be line symmetrical to each other in the right-left direction. However, the invention is not limited to the embodiment, and it is possible to use the right and left headrest holders 30 in common even if other shapes of the right and left headrest holders 30 are used in combination. FIG. 6 illustrates the various combinations of the shapes of the right and left headrest holders 30. In the table of FIG. 6, second and third columns show the shapes of the left fitting holes 22, 24 and the right fitting holes 21, 23, respectively, and first and fourth columns show the transverse cross-sectional shapes of the left headrest holder 30 and the right headrest holder 30, respectively. In other words, each of rows (A) to (0) shows the combination of the shape of the right fitting holes 21, 23 and the transverse cross-sectional shape of the right headrest holder 30 in the third and fourth columns, which is adoptable corresponding to the combination of the shape of the left fitting holes 22, 24 and the transverse cross-sectional shape of the left headrest holder 30 in the first and second columns. Note that in the table of FIG. 6, each of the fitting holes 21, 22, 23, and 24 and each of the headrest holders 30 are displayed with the top, bottom, right, and left sides of space defined as front, rear, right, and left sides, respectively, and a black dot put on each of the headrest holders 30 shows a welding spot positioned on the front side of each of the headrest holders 30. The row (A) shows an example in which the shape of the right fitting holes 21, 23 and the transverse cross-sectional shape of the right headrest holder 30 are those formed when the shape of the left fitting holes 22, 24 and the transverse cross-sectional shape of the left headrest holder 30 are moved in parallel. According to this example, it is possible to use the right and left headrest holders 30 in common with the front and rear sides of the headrest holder 30 when the headrest holder 30 fits in the right fitting holes 21, 23 being maintained to be the front and rear sides of the headrest holder 30 when the head rest holder 30 fits in in the left fitting holes 22, 24. In this case, however, since the shapes of the headrest support 42a, 42b when the headrest supports 42a, 42b are allowed to fit respectively in the right and left headrest holders 30 are the same, they may not be distinguished from each other. Therefore, a jig is additionally required to correctly insert the headrest supports 42a and 42b.

The row (B) shows an example in which the shape of the right fitting holes 21, 23 and the transverse cross-sectional shape of the right headrest holder 30 are those formed when the shape of the left fitting holes 22, 24 and the transverse cross-sectional shape of the left headrest holder 30 are rotated clockwise by 90°. According to this example, it is possible to use the right and left headrest holders 30 in common although the front and rear sides of the headrest holder 30 when the headrest holder 30 fits in the right fitting holes 21, 23 is not maintained to be the front and rear sides of the headrest holder 30 when the headrest holder 30 fits in in the left fitting holes 22, 24. In this case, the shapes of the headrest supports 42a, 42b when the headrest supports 42a, 42b are allowed to fit respectively in the right and left headrest holders 30 can be distinguished from each other. Therefore, when the right and left headrest supports 42a, 42b are formed in conformity with the shapes of the corresponding headrest holders 30, the corresponding headrest supports 42a, 42b may correctly fit in the right and left headrest holders 30, respectively, without the use of a special jig. The rows (C) and (D) show examples in which the shape of the right fitting holes 21, 23 and the transverse cross-sectional shape of the right headrest holder 30 are those formed when the shape of the right fitting holes 21, 23 and the transverse cross-sectional shape the right headrest holder 30 shown in the row (B) are further rotated clockwise with an increase in angle for every 90°. According to these examples, like the example shown in the row (B), it is possible to use the right and left headrest holders 30 in common although the front and rear sides of the headrest holder 30 when the headrest holder 30 fits in the right fitting holes 21, 23 is not maintained to be the front and rear sides of the headrest holder 30 when the head rest holder 30 fits in in the left fitting holes 22, 24. In addition, the shapes of the headrest supports 42a, 42b when the headrest supports 42a, 42b are allowed to fit respectively in the right and left headrest holders 30 can be distinguished from each other. Therefore, when the right and left headrest supports 42a, 42b are formed in conformity with the shapes of the corresponding 10 headrest holders 30, the corresponding headrest supports 42a, 42b can correctly fit in the right and left headrest holders 30, respectively.

The row (E) shows an example in which the shape of the right fitting holes 21, 23 and the transverse cross-sectional shape of the right headrest holder 30 are those formed when the shape of the left fitting holes 22, 24 and the transverse cross-sectional shape of the left headrest holder 30 are inverted vertically and then further rotated clockwise by 90°. According to this example, it is possible to use the right and left headrest holders 30 in common although the front and rear sides of each of the headrest holders 30 when the headrest holder 30 fits in the right fitting holes 21, 23 is not maintained to be the front and rear sides of the headrest holder when the head rest holder fits in in the left fitting holes 22, 24. In addition, the shapes of the headrest supports 42a, 42b when the headrest supports 42a, 42b are allowed to fit respectively in the right and left headrest holders 30 can be distinguished from each other. Therefore, when the right and left headrest supports 42a, 42b are formed in conformity with the shapes of the corresponding headrest holders 30, the corresponding headrest supports 42a, 42b can correctly fit in the right and left headrest holders 30, respectively, without the use of a special jig. The rows (F) and (G) show examples in which the shape of the right fitting holes 21, 23 and the transverse cross-sectional shape of the right headrest holder 30 are those formed when the shape of the right fitting holes 21, 23 and the transverse cross-sectional shape of the right headrest holder 30 shown in the row (E) are further rotated clockwise with an increase in angle for every 90°. According to these examples, like the example shown in the row (E), it is possible to use the right and left headrest holders 30 in common although the front and rear sides of the headrest holder 30 when the headrest holder 30 fits in the right fitting holes 21, 23 is not maintained to be the front and rear sides of the headrest holder 30 when the head rest holder 30 fits in in the left fitting holes 22, 24. In addition, the shapes of the headrest supports 42a, 42b when the headrest supports 42a, 42b are allowed to fit respectively in the right and left headrest holders 30 can be distinguished from each other. Therefore, when the right and left headrest supports 42a and 42b are formed in conformity with the shapes of the corresponding headrest holders 30, the corresponding headrest supports 42a, 42b can correctly fit in the right and left headrest holders 30, respectively.

Figure 7:
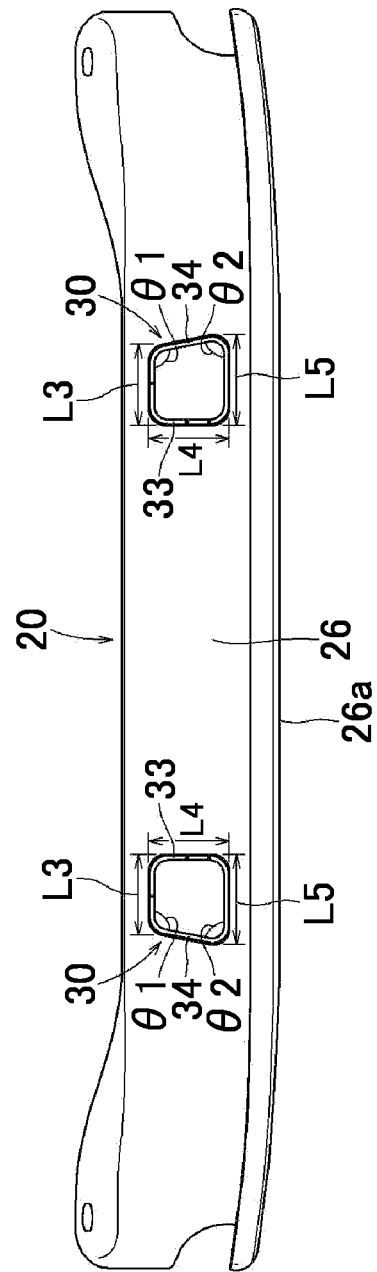
FIG. 7 is a plan view of a principal portion according to a second embodiment of the invention.

FIG. 7 shows a second embodiment of the invention. The second embodiment is different from the first embodiment in that the fitting holes 21, 22, 23, 24 of the upper frames 20' and the transverse cross-sections of the headrest holders 30 according to the second embodiment have a trapezoidal shape, while those according to the first embodiment have a rectangular shape with a portion thereof being changed. The other configurations of the two embodiments are the same and thus the detailed explanation will be omitted.

In FIG. 7, the transverse cross-sectional shape of each headrest holder 30 is a trapezoid. The trapezoid satisfies the relationship L3<L5 where L3 expresses a length of an upper base and L5 expresses a length of a lower base. A length L4 of one leg 33 of two legs of the trapezoid is an intermediate length between the length L3 of the upper base and the length L5 of the lower base. However, the length L4 of the one leg 33 of the trapezoid may be smaller than the length L3 of the upper base, or may be larger than the length L5 of the lower base. The one leg 33 of the trapezoid is orthogonal to the upper base and the lower base (both an angle formed between the one leg 33 and the upper base and an angle formed between the one leg 33 and the lower base are right angles), while the other leg 34 of the two legs of the trapezoid is not orthogonal to the upper base and the lower base. Here, an angle θ1 formed between the upper base and the other leg 34 of the trapezoid is an obtuse angle, and an angle θ2 formed between the lower base and the other leg 34 of the trapezoid is an acute angle. The trapezoid having rounded corners as shown in FIG. 7 is also included in the "trapezoid" referred in the invention.

Each of the fitting holes 21, 22, 23, 24 of the upper frames 20 is formed in a size and a shape to receive the corresponding headrest holder 30. Thus, each of the headrest holders 30 is allowed to fit in the corresponding fitting holes 21, 22, 23, 24 only when the headrest holder 30 faces a prescribed direction. The fitting holes 21, 22 as well as the fitting holes 23, 24 arranged side by side in the right-left direction on the upper frame 20 are formed to be line symmetrical about the center in the right-left direction of the upper frame 20. Therefore, when the headrest holder 30 allowed to fit in the fitting holes 21, 23 (or the fitting holes 22, 24) on one side is inverted vertically, it is allowed to fit in the fitting holes 22, 24 (or the fitting holes 21, 23) on the other side. In other words, the headrest holder 30 fitting in the fitting holes 21, 23 on one side and the headrest holder 30 fitting in the fitting holes 22, 24 on the other side can be used in common.

According to the second embodiment, the fitting holes 21, 22, 23, 24 of the upper frames 20 and the transverse cross-sections of the headrest holders 30 have the trapezoidal shape, which facilitates manufacture of the headrest holders 30 as compared with the first embodiment in which the fitting holes 21, 22, 23, 24 of the upper frames 20 and the transverse cross-sections of the headrest holders 30 have the rectangular shape with a portion thereof is changed. The manufacturing process of the headrest holders 30 in the first embodiment includes formation of two different types of the rounded corners, i.e. the smaller rounded corners and the greater rounded corner. On the other hand, the headrest holders 30 in the second embodiment only need to be formed in a shape having the trapezoidal transverse cross-section. Accordingly, the difficulty in manufacturing the headrest holders 30 in the second embodiment decreases.

The specific embodiment is described above, but the invention is not limited to the appearances and the configurations of the embodiment and may be modified, supplemented, or deleted insofar they are within the scope thereof. The bridging portion 31 of each of the headrest holders 30 has an arc shape in the embodiment but may be shaped linearly such that each of the fitting holes 21, 22, 23, and 24 has a pentagonal shape. The transverse cross-sectional shape of each of the headrest holders 30 is a substantially rectangle and the length L2 of the rectangle in the front-rear direction is set to be smaller than the length L1 of the rectangle in the right-left direction (L1>L2) in the embodiment, but the length L2 of the rectangle in the front-rear direction may be set to be larger than the length L1 of the rectangle in the right-left direction (L1<L2). The invention is applied to the seat of an automobile in the embodiment but may be applied to seats installed in conveyances such as airplanes, ships, and trains.

As detailed above, an aspect of the invention provides a headrest support structure of a conveyance seat, includes: an upper frame that is provided with a pair of fitting holes and that constitutes a back frame; and a pair of cylindrical headrest holders, each of which fits in one of the pair of fitting holes to be fixed to the upper frame. A transverse cross-section of a fitting portion of each headrest holder fitting in the corresponding fitting hole has an asymmetric shape about a fitting axis parallel to a fitting direction in which the headrest holder fits in the fitting hole, the transverse cross-section being a cross-section in a direction orthogonal to the fitting axis. The pair of fitting holes is formed such that each headrest holder is allowed to fit in only one of the pair of fitting holes provided at a position set as a fixing position of the headrest holder. According to the configuration, even if the pair of headrest holders is used in common, the headrest holders may be fixed at their suitable positions or may be fixed at positions suitable for the pair of headrest supports fitting in the headrest holders. Accordingly, the headrest holders can be used in common while satisfying requirements needed as the headrest holders.

The transverse cross-section of the fitting portion may have a shape in which one corner of a rectangle is changed such that two sides connected to the one corner are joined with a bridging portion. Also, the transverse cross-section of the fitting portion may have a trapezoidal shape having two adjacent right angles, an obtuse angle, and an acute angle. According to the configuration, the headrest holders can be fixed at a specific position while simplifying shape of the fitting portions thereof.

The pair of fitting holes may be formed such that front and rear sides of each headrest holder when the headrest holder fits in one fitting hole are the front and rear sides of the headrest holder when the head rest holder fits in the other fitting hole. According to the configuration, the headrest holders can be used in common while satisfying requirements needed as the headrest holders.

The headrest support structure may further include a pair of headrest supports, each of which fits in one of the pair of headrest holders. In this case, the pair of fitting holes may be formed such that each headrest support correctly fits in the corresponding headrest holder. According to the configurations, the headrest holders can be used in common while satisfying requirements needed as the headrest holders.

The pair of fitting holes may be provided to be line symmetrical to each other. According to the configuration, when the pair of headrest holders is used in common, the front and rear sides of each headrest holder when the headrest holder fits in one fitting hole are the front and rear sides of the headrest holder when the head rest holder fits in the other fitting hole. In addition, when the pair of headrest holders is used in common, the respective headrest supports are prevented from being falsely inserted in the respective fitting holes. Accordingly, the headrest holders can be used in common while satisfying requirements needed as the headrest holders.

The fitting portion may have a plurality of corners, and one of the plurality of corners may be formed in a different shape from the other corners. In addition, each headrest holder may be formed such that a shape of the transverse cross-section of the fitting portion is changed when the headrest holder is inverted in a top-bottom direction of the conveyance seat or rotated about the fitting axis. Further, one of the pair of the headrest holders may fit in one of the pair of the fitting holes in a state of being inverted in a top-bottom direction of the conveyance seat or rotated about the fitting axis with respect to the other headrest holder fitting in the other fitting hole.

What is claimed is:

1. A headrest support structure of a conveyance seat, comprising:
    an upper frame that is provided with a pair of fitting holes and that constitutes a back frame; and
    a pair of cylindrical headrest holders, each of which is configured to fit in each of the pair of fitting holes to be fixed to the upper frame, wherein
    a transverse cross-section of a fitting portion of each headrest holder configured to fit in each of the corresponding fitting holes has an asymmetric shape about a fitting axis parallel to a fitting direction in which the headrest holder fits in the fitting hole, the transverse cross-section being a cross-section in a direction orthogonal to the fitting axis,
    the pair of fitting holes are oriented differently relative to each other and when the asymmetric shapes of each headrest holder are oriented in a same initial position about the respective fitting axis of each headrest holder, the asymmetric shapes of each of the pair of headrest holders is configured to fit in one of the pair of fitting holes, and the asymmetric shapes of each of the pair of headrest holders is configured to fit in the other of the pair of fitting holes only when the pair of the headrest holders are at least one of:
        inverted in a top-bottom direction of the conveyance seat with respect to the initial position; and
        rotated about the fitting axis of the respective headrest holder with respect to the initial position.

2. The headrest support structure of the conveyance seat according to claim 1, wherein the transverse cross-section of the fitting portion has a shape in which one corner of a rectangle is changed such that two sides connected to the one corner are joined with a bridging portion.

3. The headrest support structure of the conveyance seat according to claim 1, wherein the transverse cross-section of the fitting portion has a trapezoidal shape having two adjacent right angles, an obtuse angle, and an acute angle.

4. The headrest support structure of the conveyance seat according to claim 1, wherein the pair of fitting holes is provided such that front and rear sides of each headrest holder when the headrest holder fits in one fitting hole are the front and rear sides of the headrest holder when the headrest holder fits in the other fitting hole.

5. The headrest support structure of the conveyance seat according to claim 1, further comprising a pair of headrest supports, each of which fits in one of the pair of headrest holders, wherein
    the pair of fitting holes is provided such that each headrest support fits in the corresponding headrest holder.

6. The headrest support structure of the conveyance seat according to claim 1, wherein the pair of fitting holes is provided to be line symmetrical to each other.

7. The headrest support structure of the conveyance seat according to claim 1, wherein the fitting portion has a plurality of corners, and one of the plurality of corners is a different shape from the other corners.

8. The headrest support structure of the conveyance seat according to claim 1, wherein each headrest holder is provided such that an orientation of the transverse cross-section of the fitting portion is changed only when the headrest holder is one of inverted in a top-bottom direction of the conveyance seat and rotated about the fitting axis.

* * * * *